United States Patent
Li et al.

(10) Patent No.: US 7,894,353 B2
(45) Date of Patent: Feb. 22, 2011

(54) METHOD, APPARATUS, AND SYSTEM FOR DIAGNOSING ROUTE IN NETWORK BASED ON DIAMETER PROTOCOL

(75) Inventors: Jijun Li, Shenzhen (CN); Yuping Zhao, Shenzhen (CN); Hongguang Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 12/465,184

(22) Filed: May 13, 2009

(65) Prior Publication Data

US 2009/0232011 A1     Sep. 17, 2009

Related U.S. Application Data

(63) Continuation of application No. PCT/CN2007/070618, filed on Sep. 4, 2007.

(30) Foreign Application Priority Data

Feb. 14, 2007  (CN)  .......................... 2007 1 0080186

(51) Int. Cl.
*H04L 12/26* (2006.01)
(52) U.S. Cl. ....................... 370/248; 370/389
(58) Field of Classification Search ................ 370/241, 370/248–254, 389, 392, 395.5–395.52, 400–401
See application file for complete search history.

(56) References Cited

U.S. PATENT DOCUMENTS 6,915,345 B1 * 7/2005 Tummala et al. ............ 709/225
7,453,876 B2 * 11/2008 Hua et al. .................... 370/392

2004/0208186 A1   10/2004  Eichen et al.

(Continued)

FOREIGN PATENT DOCUMENTS

CN          1710882         12/2005

(Continued)

OTHER PUBLICATIONS

Calhoun et al, Diameter Base Protocol, RFC 358, 189 pages, Sep. 2003.*

(Continued)

*Primary Examiner*—Frank Duong
(74) *Attorney, Agent, or Firm*—Brinks Hofer Gilson & Lione

(57) ABSTRACT

A method, system, and apparatus for diagnosing a route in a network based on a Diameter protocol are provided. The method includes the following steps. A source Diameter node generates a diagnosis message and sends it. An intermediate Diameter node adds diagnosis information thereof to the diagnosis message after receiving it and forwards it until the diagnosis message is forwarded to a Diameter server capable of processing the diagnosis message or a Diameter node incapable of forwarding the diagnosis message. The Diameter server or the Diameter node generates a response message and sends it carrying diagnosis information thereof, information in the diagnosis message, and a response type. The intermediate Diameter node adds the diagnosis information thereof to the response message after receiving it, and forwards it until the response message is forwarded to the source Diameter node. The source Diameter node parses the response message to obtain route related information.

16 Claims, 4 Drawing Sheets

U.S. PATENT DOCUMENTS

2006/0067338 A1    3/2006   Hua et al.
2009/0185494 A1*   7/2009   Li et al. ..................... 370/241

FOREIGN PATENT DOCUMENTS

CN          1859238          11/2006

OTHER PUBLICATIONS

Garcia-Martin et al, Diameter Session Initiation Protocol (SIP) Application, RFC 4740, 92 pages, Nov. 2006.*
Stevens, W. Richard "The Protocols" TCP IP Illustrated vol. 1.
Calhoun, P. et al. "Diameter Base Protocol" The Internet Society. Sep. 2003.
Tsou, T. "Diameter Routing Extensions draft-tsou-dime-base-routing—ext-00" The Internet Society. Jun. 6, 2006.

* cited by examiner

METHOD, APPARATUS, AND SYSTEM FOR DIAGNOSING ROUTE IN NETWORK BASED ON DIAMETER PROTOCOL

CROSS-REFERENCE TO RELATED APPLICATIONS

This application is a continuation of International Patent Application No. PCT/CN2007/070618, filed on Sep. 4, 2007, which claims priority to Chinese Patent Application No. 200710080186.6, filed on Feb. 14, 2007, both of which are hereby incorporated by reference in their entirety.

FIELD OF THE TECHNOLOGY

The present invention relates to a route diagnosis technology for communication networks, and more particularly to a method, apparatus, and system for diagnosing a route in a network based on a Diameter protocol.

BACKGROUND

In an Internet protocol (IP) network, it often needs to diagnose routes with IP packets passing through, for example, to determine whether a route for transmitting an IP packet is smooth or not as well as network equipment that the IP packet passes through. Currently, there are two route diagnosis methods in IP networks. One is packet Internet groper (ping) method, and the other is traceroute method. The two methods are briefly introduced below.

Ping Method

This method adopts an Internet control message protocol (ICMP) to echo message and response of the echo message, and is usually used in IP networks to test the reachability of network equipment. In a specific implementation, source network equipment sends an ICMP echo request packet to destination network equipment, and waits for the destination network equipment to return an ICMP echo reply packet so as to obtain a route diagnosis result according to the ICMP echo reply packet. The ICMP echo request packet carries a time stamp at which the request is sent, for calculating a round-trip time. When the ICMP echo reply packet is returned, the echo reply packet carries the time stamp at which the request is sent. The round-trip time is obtained by subtracting the time stamp carried in the echo reply packet from the current time stamp at which the packet is received. All different versions of the route diagnosis method of ping provide an –R option with a record route function.

Traceroute Method

The route diagnosis method of traceroute determines a route that an IP packet passes through from source network equipment to destination network equipment based on the principles that a source address of an ICMP response packet containing timeout information is the address of the destination network equipment. A specific implementation is described as follows. The source network equipment sends an IP packet with a time-to-live (TTL) field of 1 to the destination network equipment. First network equipment that processes the IP packet subtracts 1 from the value of the TTL field, discards the IP packet, and then sends a timeout ICMP response packet to the source network equipment. The ICMP response packet carries an IP address of the first network equipment that processes the IP packet. As such, the source network equipment obtains the IP address of the first network equipment in the route for transmitting the IP packet. After that, the source network equipment sends an IP packet with a TTL field of 2, and accordingly obtains an IP address of second network equipment in the route for transmitting the IP packet. The process is continued until the IP packet is sent to the destination network equipment, and thus IP addresses of all network equipment in the route for transmitting the IP packet are obtained. When receiving the IP packet with a TTL field of 1, the destination network equipment does not discard the IP packet, but still generates an ICMP response packet.

The two route diagnosis methods are usually employed for routine maintenance of the IP networks. By using the two route diagnosis methods, the reachability of an IP packet to the destination network equipment can be preliminarily tested, problems in the route for transmitting the IP packet can be diagnosed, and route information that the IP packet passes through can be determined. Both of the two methods adopt the IP address of the destination network equipment as a key parameter, because routes in IP networks are based on IP addresses.

The methods for diagnosing a route in an IP network are described above. Likewise, there is also a need to diagnose an application layer route in a network based on a Diameter protocol, i.e. to diagnose the reachability of the application layer route and information about Diameter nodes in the route.

FIG. 1 is a schematic view of realm-based routes in a network based on a Diameter protocol in the prior art. Referring to FIG. 1, three routes are shown (respectively indicated by fine solid lines, dashed lines, and heavy solid lines in FIG. 1, and each block represents a Diameter node). The three routes are respectively corresponding to three different applications, for example, respectively corresponding to a network access server (NAS) application of the Diameter protocol, a mobile Internet protocol (MIP) application of the Diameter protocol, and a session initiation protocol (SIP) application of the Diameter protocol. The three routes have the same destination realm, the same Diameter client A, and the same Diameter server K.

The network based on the Diameter protocol is configured by various types of Diameter nodes, including a Diameter relay, a Diameter proxy, a Diameter redirector, and a Diameter converter, in addition to the Diameter client and the Diameter server. In actual applications, each Diameter node may play different roles at the same time, for example, function as a Diameter client for one realm and as a Diameter server for another; or function as a Diameter relay for forwarding a message of one type when the message arrives and as a Diameter proxy when a message of another type arrives. As network applications based on the Diameter protocol involve different realms, different applications, and various cases such as whether the Diameter node supports a certain realm or application and whether the Diameter node passes a security authentication, the application layer routes of the network based on the Diameter protocol become quite complex. Further, different configuration policies adopted in the network and the result of capability negotiation among the Diameter nodes may also influence the conditions of the application layer routes. Therefore, there is a need to diagnose the reachability of the application layer routes and collection of topology information of the Diameter nodes in the network based on the Diameter protocol, especially in a large-scale network based on the Diameter protocol.

Currently, technical contents about attribute value pairs (AVPs) of application layer routes and application layer route information can be found in the Diameter base protocol RFC3588 and other related protocols. A specific application message carries Route-Record AVP information for loop detection of the Diameter nodes, and a Diameter server acknowledges and authorizes a route that the application message passes through. However, the inventors found in the process of implementing the present invention that the prior art fails to propose a specific diagnosis method for application layer routes, and cannot provide information for timely and effectively diagnosing the route for transmitting the application message, which is disadvantageous in finding the problem about network configuration for transmitting the application message and the problem about domain security. In addition, the AVP information also cannot provide sufficient information for route diagnosis.

Hence, there is a need for a simple and universal method for quickly and directly diagnosing an application layer route in a network based on a Diameter protocol.

SUMMARY

Various embodiments of the present invention provide a method, apparatus, and system for diagnosing a route in a network based on a Diameter protocol so as to diagnose an application layer route in a network based on a Diameter protocol.

The solutions provided by the embodiments of the present invention are described as follows.

A method for diagnosing a route in a network based on a Diameter protocol includes the following steps.

A source Diameter node generates a diagnosis message according to diagnosis parameters and sends the diagnosis message. An intermediate Diameter node adds diagnosis information thereof to the diagnosis message after receiving the diagnosis message, and forwards the diagnosis message until the diagnosis message is forwarded to a Diameter server capable of processing the diagnosis message or a Diameter node incapable of forwarding the diagnosis message.

The Diameter server capable of processing the diagnosis message or the Diameter node incapable of forwarding the diagnosis message generates a response message for the diagnosis message, and sends the response message carrying diagnosis information thereof, information in the diagnosis message, and a response type. The intermediate Diameter node receiving the response message adds the diagnosis information thereof to the response message, and forwards the response message until the response message is forwarded to the source Diameter node. The source Diameter node parses the response message to obtain route related information.

An apparatus for diagnosing a route in a network based on a Diameter protocol is provided. The apparatus includes a Diameter message receiving module, a Diameter message processing module, a Diameter message sending module, and a diagnosis message forwarding and processing module. The diagnosis message forwarding and processing module is connected to the Diameter message processing module, and is adapted to add diagnosis information of the present node to a diagnosis message or a response message received by the Diameter message receiving module and transmitted to the Diameter message processing module, and then forward the diagnosis message or the response message via the Diameter message sending module.

A system for diagnosing a route in a network based on a Diameter protocol is provided. The system includes a source Diameter node, an intermediate Diameter node, and a destination Diameter node.

The source Diameter node is adapted to generate a diagnosis message according to diagnosis parameters, send the diagnosis message to the intermediate Diameter node, and receive a response message returned by the intermediate Diameter node to obtain route information.

The intermediate Diameter node is adapted to add diagnosis information to the received diagnosis message, forward the diagnosis message until the diagnosis message is forwarded to the destination Diameter node, add the diagnosis information thereof to the received response message, and forward the response message until the response message is forwarded to the source Diameter node.

The destination Diameter node is adapted to generate a response message carrying the information in the diagnosis message, a response type, and diagnosis information thereof after receiving the diagnosis message from the intermediate Diameter node, and send the response message to the intermediate Diameter node.

Seen from the above solutions, in the embodiments of the present invention, the source Diameter node generates a diagnosis message according to diagnosis parameters and sends the diagnosis message. The intermediate Diameter node adds diagnosis information thereof to the diagnosis message after receiving the diagnosis message, and forwards the diagnosis message until the diagnosis message is forwarded to the Diameter server capable of processing the diagnosis message or the Diameter node incapable of forwarding the diagnosis message frontward. The Diameter server capable of processing the diagnosis message or the Diameter node incapable of forwarding the diagnosis message generates a response message of the diagnosis message, sends the response message carrying diagnosis information thereof, diagnosis information in the diagnosis message, and a response type. An intermediate Diameter node receiving the response message of the diagnosis message adds the diagnosis information thereof to the response message of the diagnosis message, and forwards the response message until the response message is forwarded to the source Diameter node. The source Diameter node obtains application layer route related information corresponding to the diagnosis parameters according to the information carried in the response message of the diagnosis message. Thus, the embodiments of the present invention can provide a simple and universal method for quickly and directly diagnosing an application layer route in a network based on a Diameter protocol.

DETAILED DESCRIPTION

Figure 1:
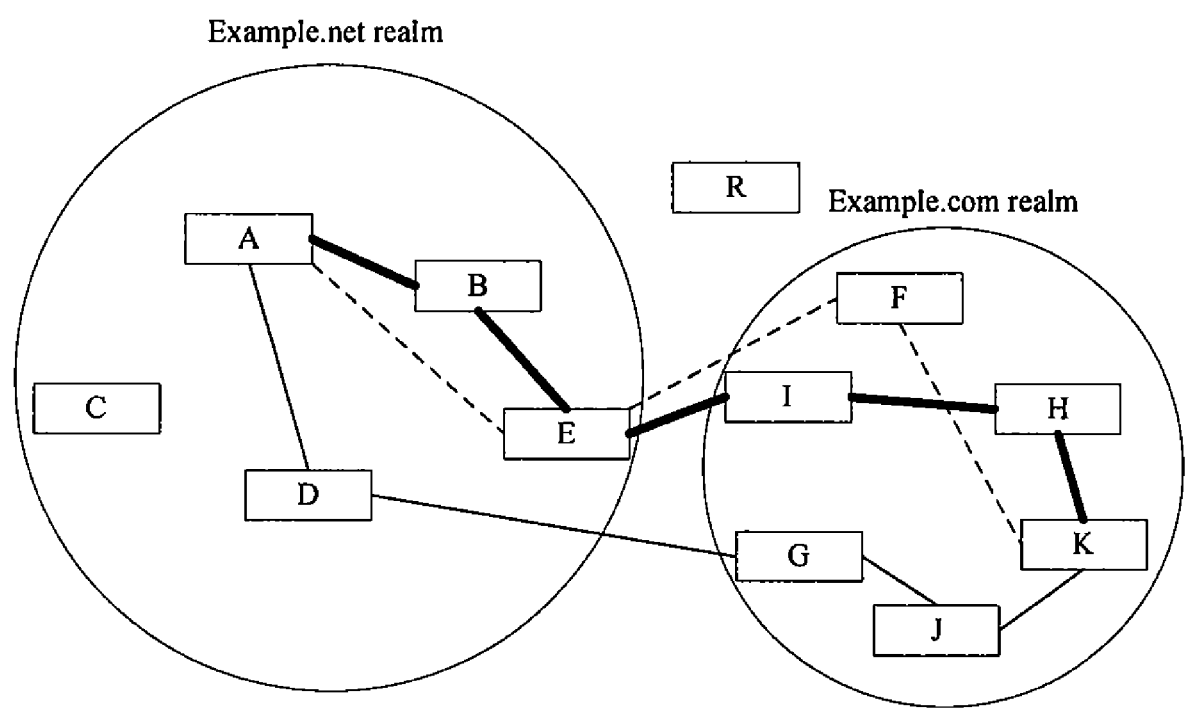
FIG. 1 is a schematic view of realm-based routes in a network based on a Diameter protocol in the prior art.

In order to make the objectives, technical solutions, and advantages of the present invention comprehensible, embodiments accompanied with figures are described in detail below.

In order to diagnose an application layer route in a network based on a Diameter protocol, in the embodiments of the present invention, a source Diameter node generates a diagnosis message according to diagnosis parameters (the generation process may be carrying the diagnosis parameters in the diagnosis message) and sends the diagnosis message. An intermediate Diameter node adds diagnosis information thereof (the diagnosis information is corresponding to the diagnosis parameters carried in the diagnosis message) to the diagnosis message after receiving the diagnosis message, and forwards the diagnosis message until the diagnosis message is forwarded to a Diameter server capable of processing the diagnosis message or a Diameter node incapable of forwarding the diagnosis message frontward. The Diameter server capable of processing the diagnosis message or the Diameter node incapable of forwarding the diagnosis message generates a response message of the diagnosis message, that is, carry diagnosis information thereof, diagnosis information in the diagnosis message, and a response type in the response message and send it. An intermediate Diameter node receiving the response message of the diagnosis message adds the diagnosis information thereof to the response message of the diagnosis message, and forwards the response message until the response message is forwarded to the source Diameter node. According to the information carried in the response message of the diagnosis message, the source Diameter node obtains application layer route related information corresponding to the diagnosis parameters. The application layer route related information includes uplink application layer route related information (the diagnosis information added by the Diameter nodes to the diagnosis message) and downlink application layer route related information (the diagnosis information added by the Diameter nodes to the response message of the diagnosis message).

In embodiments of the present invention, the diagnosis parameters include a routing realm and an application identifier (ID) for diagnosing the route connectivity based on a designated realm and application. The diagnosis parameters can be input. The source Diameter node generates the diagnosis message according to the diagnosis parameters, and a Diameter node that receives the diagnosis message routes the diagnosis message to the next Diameter node according to local route information. The diagnosis message is continuously processed in this manner until arriving at a Diameter node incapable of forwarding the diagnosis message or a Diameter server capable of locally processing the diagnosis message.

In embodiments of the present invention, the diagnosis parameters are generated according to a diagnosis objective, and input in the following manner. The diagnosis parameters are input as a command line, and a system based on the Diameter protocol obtains the diagnosis parameters from the command line; or the diagnosis parameters are expressed as a configuration file, and a system based on the Diameter protocol obtains the diagnosis parameters by reading the file. When the diagnosis parameters are expressed as a configuration file, the configuration file may be an eXtensible Markup Language (XML) file.

The diagnosis information added by the Diameter nodes to the diagnosis message or the response message of the diagnosis message may include a node identifier and a role of the Diameter node. The role includes a Diameter client, a Diameter relay, a Diameter proxy, a Diameter redirector, a Diameter converter, or a Diameter server. The source Diameter node realizes route information in accordance with the node identifier and the role collected. The diagnosis information may further include time stamp information and/or a ROUTE_TTL_AVP. The time stamp information indicates the time at which the Diameter nodes receive the diagnosis message or the response message of the diagnosis message, and is adapted to diagnose and calculate a round-trip time of the diagnosis message or the response message of the diagnosis message between any two Diameter nodes. The round-trip time may provide a reference for repeated packet detections. The ROUTE_TTL_AVP is adapted to limit the number of the Diameter nodes that the diagnosis message passes through so as to avoid unlimited forwarding of the diagnosis message.

In an embodiment of the present invention, besides a Diameter client, the source Diameter node may also be an intermediate Diameter node such as a Diameter relay, a Diameter proxy, a Diameter redirector, a Diameter converter, or a Diameter server, as long as the source Diameter node is a Diameter network entity capable of generating the diagnosis message according to the diagnosis parameters. In this embodiment, a network entity capable of locally processing the diagnosis message is generally a Diameter server.

In an embodiment of the present invention, the response message sent to the source Diameter node carries downlink information and uplink information. The purpose of adding the roles and node identifiers to the response message is to enable the source Diameter node to determine all the participants in a route for transmitting the application message, so that the roles and node identifiers need to be added in both the uplink and downlink directions. Further, as the uplink routing path and the downlink routing path for transmitting the application message may be different, the roles and node identifiers need to be added in both the uplink and downlink directions, thus forming a complete route for the Diameter application message.

In the response message, uplink information and downlink information can be differentiated. The reason is that the intermediate Diameter nodes respectively add the diagnosis information after receiving the diagnosis message and the response message of the diagnosis message, so that differences can be easily found in the response message. For example, 1-2-3-4-5-5-4-3-2-1, or 1-2-3-4-5-5-6-3-2-1, where 1 represents the identifier of the source Diameter node, and 5 represents the identifier of the destination Diameter node (not necessarily a Diameter server, and may also be a Diameter node incapable of forwarding the diagnosis message frontward). A method for distinguishing uplink information and downlink information is also provided by setting two AVPs in the response message, namely an uplink AVP-GROUP and a downlink AVP-GROUP so as to respectively store the uplink information and the downlink information.

Figure 2:
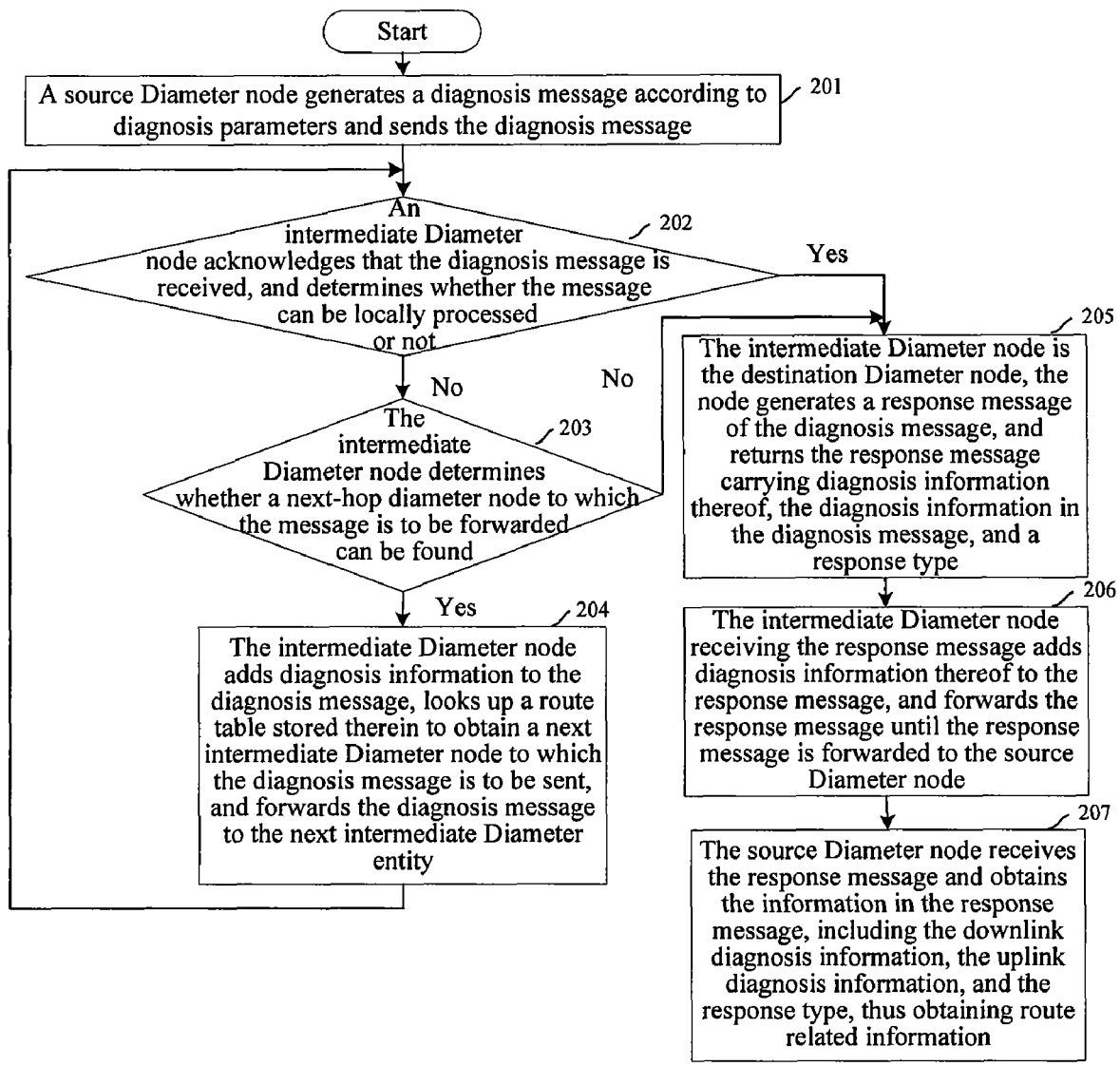
FIG. 2 is a flow chart of a method for diagnosing a route in a network based on a Diameter protocol according to an embodiment of the present invention.

FIG. 2 is a flow chart of a method for diagnosing a route in a network based on a Diameter protocol according to an embodiment of the present invention. The method specifically includes the following steps.

In Step 201, a source Diameter node generates a diagnosis message according to diagnosis parameters and sends the diagnosis message.

The diagnosis message may include a destination node identifier indicating a server or a destination Diameter node to which the diagnosis message is transmitted. In this step, the diagnosis parameters include a routing realm and an application ID.

In Step 202, an intermediate Diameter node acknowledges that the diagnosis message is received, and determines whether the message can be locally processed or not. If yes, Step 205 is performed; otherwise, Step 203 is performed.

The diagnosis message contains a diagnosis message identifier, according to which a Diameter node determines a message type for further processing.

In Step 203, the intermediate Diameter node determines whether a next-hop Diameter node to which the message is to be forwarded can be found. If yes, Step 204 is performed; otherwise, Step 205 is performed.

In Step 204, the intermediate Diameter node adds diagnosis information to the diagnosis message, looks up a route table stored therein to obtain a next intermediate Diameter node to which the diagnosis message is to be sent, and forwards the diagnosis message to the next intermediate Diameter entity. After that, the process returns to Step 202 and is continuously performed.

In the existing technologies, each Diameter node stores a route table, and is adapted to determine a next Diameter node according to a destination realm and a specific application ID contained in the message and then forward the message.

In an embodiment of the present invention, a destination node identifier may also be designated in the diagnosis message so as to accurately determine a matched destination Diameter server node; otherwise, the diagnosis message may be sent to any Diameter server node that is suitable for sending the diagnosis message.

The added diagnosis information may include node identifiers and roles of Diameter nodes, and may also include time stamp information and/or a ROUTE_TTL_AVP.

In Step 205, the intermediate Diameter node is the destination Diameter node, i.e., the Diameter server node. This node generates a response message of the diagnosis message, and returns the response message carrying diagnosis information thereof, the diagnosis information in the diagnosis message, and a response type. Then, Step 206 is performed.

There are two circumstances in Step 205. One is that the intermediate Diameter node is capable of locally processing the diagnosis message, that is, the role of the intermediate Diameter node is the Diameter server. The other is that the intermediate Diameter node cannot locally process the diagnosis message but needs to forward the message, nor correctly forward the diagnosis message due to a certain reason, for example, a next intermediate Diameter node fails or does not find a corresponding route.

In this step, the response type may be success or failure. For example, when the intermediate Diameter node is incapable of forwarding the diagnosis message or is capable of locally processing but fails to process the diagnosis message, the response type is failure; and when the intermediate Diameter node locally processes the diagnosis message successfully (at this time, the intermediate equipment is the Diameter server), the response type is success. In the embodiment of the present invention, if the response type is failure, the response message may further carry a cause value of failure.

In Step 206, an intermediate Diameter node receiving the response message adds diagnosis information thereof to the response message, and forwards the response message until the response message is forwarded to the source Diameter node.

In Step 207, the source Diameter node receives the response message and obtains the information in the response message, including the downlink diagnosis information, the uplink diagnosis information, and the response type, thus obtaining route related information.

In the embodiment of the present invention, when the source Diameter node sends the diagnosis message, the diagnosis message may include a ROUTE_TTL_AVP. This value is adapted to limit the number of the intermediate Diameter nodes that the diagnosis message passes through. During the processing, the intermediate Diameter node subtracts 1 from the ROUTE_TTL_AVP value included in the diagnosis message sent by the previous-hop Diameter node, until the ROUTE_TTL_AVP value included in the received diagnosis message becomes 0. At this point, the intermediate Diameter node cannot process the diagnosis message, and generates and returns a response message of the diagnosis message.

The present invention is described below through three specific embodiments.

Figure 3:
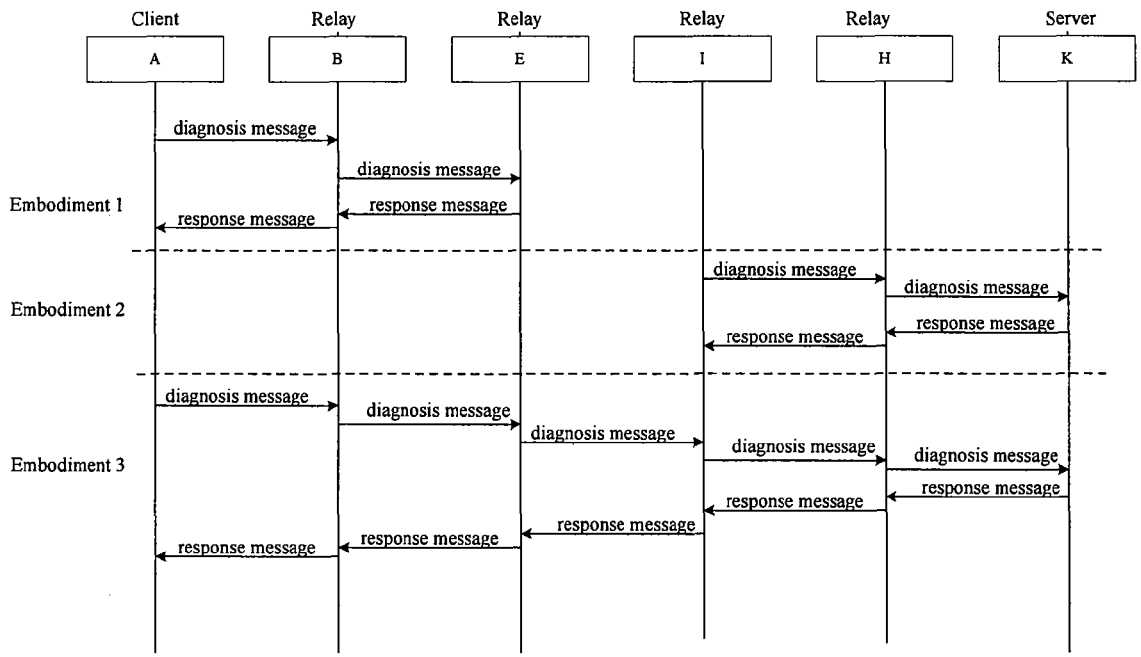
FIG. 3 is a schematic view of messages exchanging according to Embodiments 1, 2, and 3 of the present invention.

FIG. 3 is a schematic view of message exchanging according to three embodiments of the present invention. The message exchanging process is based on the network scenario shown in FIG. 1, and a message exchanging process for route diagnosis among Diameter nodes is described.

In Embodiment 1, a diagnosis message is initiated by a Diameter node A, i.e., by a Diameter client. In the diagnosis message generated according to diagnosis parameters, the main diagnosis parameters are a route realm and an application identifier expected to be diagnosis. After the diagnosis message is sent to a Diameter node B, the Diameter node B performs an identification, detects that the diagnosis message cannot be locally processed (the Diameter node B is not a server), looks up a route table thereof, and then forwards the diagnosis message. Before forwarding the diagnosis message, the Diameter node B adds a node identifier and a role thereof to the diagnosis message as diagnosis information. After the forwarded diagnosis message is forwarded to a Diameter node E, the Diameter node E performs similar operations to the Diameter node B. In this embodiment, assuming that the Diameter node E is incapable of forwarding the diagnosis message due to a certain reason (a next Diameter node I fails, does not find a route, or does not support an application corresponding to the application identifier contained in the diagnosis message; or the ROUTE_TTL_AVP in the diagnosis message is 0), the Diameter node E sets a corresponding failure value, and returns a response message carrying the failure value, a node identifier and a role thereof, and the diagnosis information in the diagnosis message. After the response message is returned to the Diameter node A, the node A extracts the information carried in the response message, and directly displays the information for reference.

In Embodiment 2, a diagnosis message is initiated by a Diameter node I (relay node). As all nodes have a diagnosis message generation function, any Diameter node can conveniently and quickly send a diagnosis message without affecting other normal application messages. In practice, the Diameter node I may only function as a forwarding relay of diagnosis realm and application messages, and may not generate or initiate a primitive message based on the diagnosis realms and applications. However, in Embodiment 2 of the present invention, the Diameter node I may be set with a diagnosis message generation function, i.e., may generate a diagnosis message according to diagnosis parameters and an application identifier and then send the diagnosis message. As such, a route diagnosis can be initiated at the intermediate Diameter node, thus providing a segmental route diagnosis method. Definitely, a Diameter node k, functioning as a server, may also send a diagnosis message. It can be found through the response message that the role of the Diameter node k is a server, so that the message does not need to be forwarded via other nodes, and only the Diameter node k initiates and participates in the current route diagnosis. In this embodiment, as the diagnosis message successfully is forwarded to the Diameter node k, i.e., to the server node; the server node can locally process the detected diagnosis message, and generate a response message of the diagnosis message with a success value.

In Embodiment 3, a diagnosis message is a completed message process that matches a specific application. The diagnosis message is initiated from a Diameter node A, i.e., a Diameter client, passes through a plurality of nodes (may pass through a plurality of domains), and finally arrives at a server k. The server k returns a response message of the diagnosis message with a success value. Through such a diagnosis process, this path for routing the Diameter application message, Diameter nodes involved in the path, roles of the Diameter nodes, as well as the time at which the Diameter application message arrives at the Diameter nodes can be collected and set up. Specific applications supported by the Diameter nodes involved in the path, whether the applications are completely deployed, current conditions of the Diameter nodes, and current network traffic distribution can be diagnosed by repeatedly running the diagnosis function.

In order to enable a Diameter node to generate a diagnosis message and a response message of the diagnosis message, the Diameter node should be able to identify the diagnosis message, process the diagnosis message according to the supporting capability thereof, modify the content of the diagnosis message, forward the diagnosis message, and generate and send a response message of the diagnosis message. The initiator of the diagnosis message should be able to generate and send a diagnosis message, diagnose and parse the response message after receiving the response message of the diagnosis message, and directly display the route related information for reference. Each Diameter node forwards the diagnosis message based on a route table and a security policy thereof.

In the embodiment of the present invention, a Diameter node needs to have functions of receiving, processing, and sending a Diameter application message. Each Diameter node has key data information, including node information, route information, time information, and security information and so on. The node information, the route information, the time information, and the security information in each Diameter node need to be used during the processing of the diagnosis message. The node information and the route information are the basis for the processing of the diagnosis message, and the time information and the security information provide materials for route diagnosis.

Figure 4:
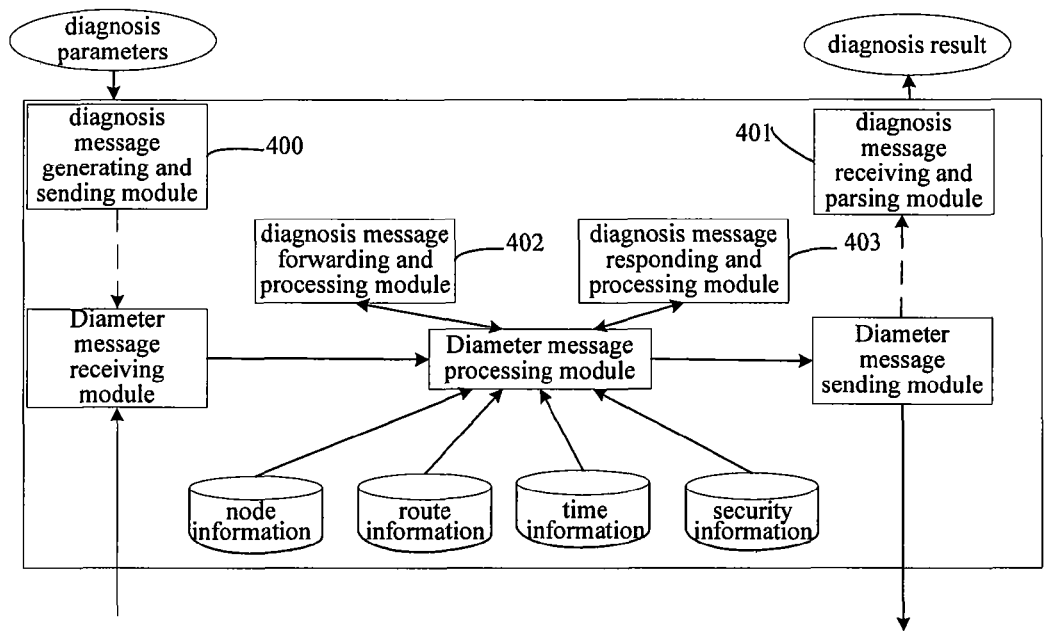
FIG. 4 is a schematic structural view of a Diameter node according to an embodiment of the present invention.

FIG. 4 is a schematic structural view of a Diameter node according to an embodiment of the present invention. Four modules are added to an existing Diameter node, which are a diagnosis message generating and sending module 400, a diagnosis message receiving and parsing module 401, a diagnosis message forwarding and processing module 402, and a diagnosis message responding and processing module 403.

The diagnosis message generating and sending module 400 and the diagnosis message receiving and parsing module 401 are modules included in a diagnosis message initiating node, and are adapted to generate a diagnosis message according to input diagnosis parameters and receive and parse a response message of the diagnosis message. The diagnosis message forwarding and processing module 402 processes the diagnosis message that needs to be forwarded, for example, adds a node identifier, a role, and time information, as well as modifies an AVP value. The diagnosis message responding and processing module 403 generates and processes a response message of the diagnosis message, not only adds a node identifier, a role, and time information to the response message, modifies an AVP value, and adds diagnosis information in the corresponding diagnosis message, but also processes details of the response result, especially sets a response failure value for an error response, and sets a response success value for a successful response.

In the Diameter node according to the embodiment of the present invention, the diagnosis message generating and sending module 400 is connected to a Diameter message receiving module in the Diameter node, and is adapted to send a generated diagnosis message to the Diameter message receiving module and then the diagnosis message is sent to an existing Diameter message sending module in the Diameter node for forwarding via a Diameter message processing module in the Diameter node.

The diagnosis message forwarding and processing module 402 is connected to the Diameter message processing module, and is adapted to process a diagnosis message or a response message received by the Diameter message receiving module and transmitted to the Diameter message processing module, add diagnosis information of the node to the diagnosis message (uplink message) or the response message (downlink message), and then forward the diagnosis message or the response message via the Diameter message sending module.

The diagnosis message responding and processing module 403 is connected to the Diameter message processing module, and is adapted to respond and process the diagnosis message received by the Diameter message receiving module and transmitted to the Diameter message processing module, generate a response message of the diagnosis message, and then send the response message via the Diameter message sending module.

During the diagnosis message forwarding and processing module 402 and the diagnosis message responding and processing module 403 process the diagnosis message received by the Diameter message processing module, the node information, the route information, the time information, and the security information may also be used.

The diagnosis message receiving and parsing module 401 is connected to the Diameter message sending module, and is adapted to parse the response message of the diagnosis message transmitted from the Diameter message processing module to the Diameter message sending module so as to obtain route related information including uplink application layer route related information and downlink application layer route related information.

Figure 5:
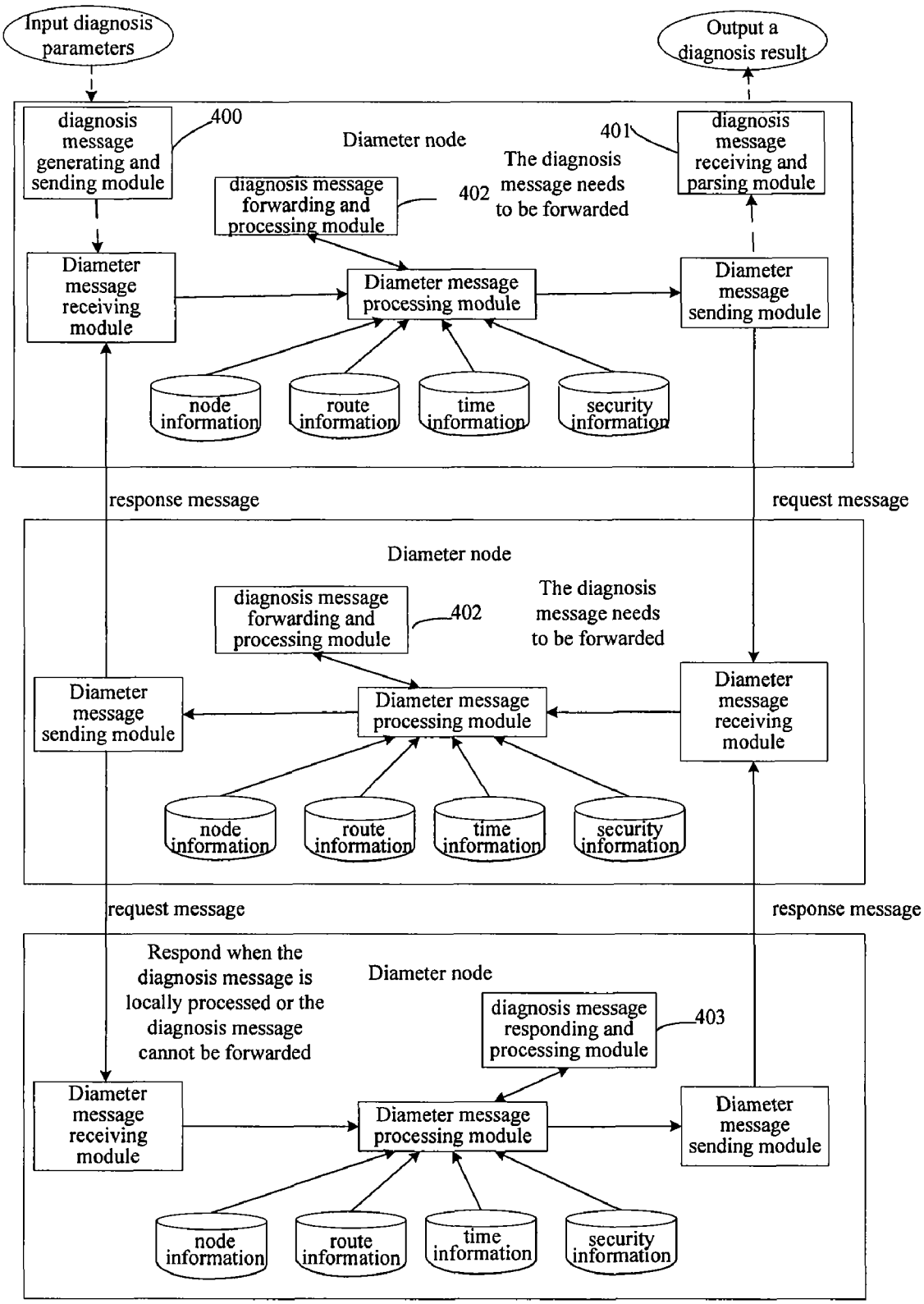
FIG. 5 is a schematic view of exchanging between Diameter nodes according to embodiments of the present invention.

In a complete message exchanging process, each Diameter node has different functions based on different roles, and may involve only a part or all of the above four different modules. FIG. 5 is a schematic view of exchanging between Diameter nodes. It should be noted that each Diameter node in FIG. 5 needs to contain the four functional modules, as each Diameter node may play multiple roles and thus may need to use the four functional modules.

In FIG. 5, a Diameter node generates a diagnosis message according to diagnosis parameters by the diagnosis message generating and sending module 400, and sends the diagnosis message to a Diameter message processing module via a Diameter message receiving module. The diagnosis message forwarding and processing module 402 first identifies the diagnosis message received by the Diameter message processing module.

If the message can be locally processed, i.e., the Diameter node is a Diameter server node, the Diameter message does not need to be forwarded to other Diameter nodes. The diagnosis message forwarding and processing module 402 directly adds an identifier and a server role of the Diameter node to the diagnosis message, and delivers the diagnosis message to the diagnosis message responding and processing module 403. The diagnosis message responding and processing module 403 generates a response message and sends the response message to a Diameter message sending module. The diagnosis message receiving and parsing module 401 parses the response message in the Diameter message sending module, and outputs route related information indicating that only one Diameter node participates in this diagnosis process, i.e., the Diameter node is the Diameter server node.

If the diagnosis message cannot be locally processed, node information and route information need to be queried. The diagnosis message forwarding and processing module 402 adds the identifier and the role of the Diameter node to the diagnosis message, and sends the diagnosis message to the Diameter message sending module for forwarding. Before the diagnosis message is forwarded, the diagnosis message forwarding and processing module 402 needs to process the diagnosis message, for example, process a ROUTE_TTL AVP in the diagnosis message, add a node identifier and a role, or process time stamp information.

The diagnosis message is continuously forwarded until the diagnosis message is forwarded to a Diameter server capable of processing the diagnosis message but the Diameter server fails to locally process the diagnosis message, or until the diagnosis message is forwarded to a Diameter node incapable of forwarding the diagnosis message. Then, for diagnosis reference, the diagnosis message responding and processing module 403 generates and returns a failure response message to show the reason why the diagnosis message cannot be forwarded. Only if the diagnosis message is forwarded to the Diameter server node and the diagnosis message responding and processing module 403 responds to the diagnosis message, a correct message is responded and is expressed as that the route is reachable at the initiator of the diagnosis message.

The method, apparatus, and system for diagnosing a route in a network based on a Diameter protocol provided in the present invention have the following advantages:

1. Simple and universal, established based on a base protocol, independent of specific applications and/or routing realms, and capable of detecting the condition of a message route by flexibly designating an application and/or a routing realm for the diagnosis, as well as diagnosing whether a Diameter node supports certain AVPs or not;

2. Supporting a time stamp function, calculating a round-trip time for a message packet, and providing a time reference for repeated packet detections;

3. Supporting the record route option, and collecting information (node type and address identifier) about nodes that the message passes through;

4. Capable of setting a message forward hop count ROUTE_TTL AVP so as to prevent the diagnosis message from being continuously delivered in the downlink direction due to the formation of a loop (though the Diameter protocol has defined a loop detection method and a solution thereof), and flexibly control the number of the Diameter nodes that the message passes through, for example, collecting the time taken by different nodes by inputting different message forwarding hop counts;

5. Taking security factors into consideration (for example, whether different routes are caused as no inter-domain security is established); and 6. Supporting the request initiated by the Diameter node client, and allowing for the initial request initiated by the intermediate Diameter node (relay Diameter node).

As the Diameter route information has many detailed circumstances, for example, a certain Diameter relay node does not support an application (for example, SIP application) in a message, does not support a destination realm in the message, cannot find a next hop (encounters a dead end), has not passed a security authentication (no security trust has been established between two domains), or encounters a routing loop, sufficient and timely information can be provided before the Diameter protocol is deployed in the network by using the universal Diameter route diagnosis method.

The objectives, technical solutions, and beneficial effects of the present invention have been described in further detail through the above specific embodiments. It should be understood that the above descriptions are merely specific embodiments of the present invention, but not intended to limit the present invention. Any modification, equivalent replacement, or improvement made under the spirit and principles of the present invention is included in the scope of the present invention.

What is claimed is:

1. A method for diagnosing a route in a network based on a Diameter protocol, comprising:

generating, by a source Diameter node, a diagnosis message according to diagnosis parameters, and sending the diagnosis message; and adding, by an intermediate Diameter node having received the diagnosis message, diagnosis information thereof to the diagnosis message, and forwarding the diagnosis message until the diagnosis message is forwarded to a Diameter server capable of processing the diagnosis message or a Diameter node incapable of forwarding the diagnosis message; and generating, by the Diameter server capable of processing the diagnosis message or the Diameter node incapable of forwarding the diagnosis message, a response message of the diagnosis message, and sending the response message carrying diagnosis information thereof, information in the diagnosis message, and a response type; adding, by an intermediate Diameter node having received the response message, diagnosis information thereof to the response message, and forwarding the response message until the response message is forwarded to the source Diameter node; and parsing, by the source Diameter node, the response message to obtain route related information.

2. The method according to claim 1, wherein the diagnosis parameters comprise a routing realm and an application identifier, and according to the routing realm and the application identifier, a routing path of the diagnosis message is determined, and a realm-based and application-based route connectivity is determined.

3. The method according to claim 1, wherein the diagnosis information comprises a node identifier and a role; wherein the role comprises a Diameter client, a Diameter relay, a Diameter proxy, a Diameter redirector, a Diameter converter, or a Diameter server; and the node identifier and the role are for the source Diameter node to determine Diameter nodes involved in a path diagnosed by the diagnosis message and roles of the involved Diameter nodes.

4. The method according to claim 3, wherein the diagnosis information further comprises time stamp information and/or a ROUTE_TTL_AVP; wherein the time stamp information indicates the time when the Diameter nodes receive the diagnosis message or the response message of the diagnosis message, and is adapted to diagnose and calculate a round-trip time of the message between any two Diameter nodes; and the ROUTE_TTL_AVP is adapted to limit the number of the Diameter nodes that the diagnosis message passes through so as to avoid unlimited forwarding of the diagnosis message.

5. The method according to claim 2, wherein the diagnosis parameters are generated according to diagnosis objectives, and input in the following manner:

inputting as a command line, and obtaining, by a system based on the Diameter protocol, the diagnosis parameters by means of reading the command line; or being expressed as a configuration file, and obtaining, by a system based on the Diameter protocol, the diagnosis parameters by means of reading the file.

6. The method according to claim 1, wherein the diagnosis message further comprises an attribute value pair (AVP) adapted to diagnose whether Diameter nodes in a routing path that the diagnosis message passes through support the AVP in the diagnosis message.

7. The method according to claim 1, wherein the source Diameter node is a network entity capable of generating the diagnosis message.

8. The method according to claim 1, wherein the source Diameter node comprises a Diameter client, a Diameter relay, a Diameter proxy, a Diameter redirector, a Diameter converter, or a Diameter server.

9. An apparatus for diagnosing a route in a network based on a Diameter protocol, comprising: a Diameter message receiving module, a Diameter message processing module, a Diameter message sending module, and a diagnosis message forwarding and processing module, wherein
the diagnosis message forwarding and processing module is connected to the Diameter message processing module, and is adapted to add diagnosis information of the present node to a diagnosis message or a response message received by the Diameter message receiving module and transmitted to the Diameter message processing module and then forward the diagnosis message or the response message via the Diameter message sending module.

10. The apparatus according to claim 9, further comprising: a diagnosis message responding and processing module, wherein
the diagnosis message responding and processing module is connected to the Diameter message processing module, and is adapted to respond and process the diagnosis message received by the Diameter message receiving module and transmitted to the Diameter message processing module, generate a response message of the diagnosis message and then send the response message via the Diameter message sending module.

11. The apparatus according to claim 10, further comprising: a diagnosis message generating and sending module and a diagnosis message receiving and parsing module, wherein
the diagnosis message generating and sending module is connected to the Diameter message receiving module and is adapted to send a generated diagnosis message to the Diameter message receiving module, and then the diagnosis message is sent via the Diameter message processing module to the Diameter message sending module for forwarding; and
the diagnosis message receiving and parsing module is connected to the Diameter message sending module, and is adapted to parse a response message of the diagnosis message transmitted from the Diameter message processing module to the Diameter message sending module so as to obtain route related information.

12. A system for diagnosing a route in a network based on a Diameter protocol, comprising: a source Diameter node, an intermediate Diameter node, and a destination Diameter node, wherein
the source Diameter node is adapted to generate a diagnosis message according to diagnosis parameters, send the diagnosis message to the intermediate Diameter node, and receive a response message returned by the intermediate Diameter node to obtain route information;
the intermediate Diameter node is adapted to add diagnosis information to the received diagnosis message, forward the diagnosis message until the diagnosis message is forwarded to the destination Diameter node, add the diagnosis information thereof to the received response message, and forward the response message until the response message is forwarded to the source Diameter node; and
the destination Diameter node is adapted to generate a response message carrying the information in the diagnosis message, a response type, and diagnosis information thereof after receiving the diagnosis message from the intermediate Diameter node, and send the response message to the intermediate Diameter node.

13. The system according to claim 12, wherein the intermediate Diameter node comprises a Diameter message receiving module, a Diameter message processing module, a Diameter message sending module, and a diagnosis message forwarding and processing module;
wherein the diagnosis message forwarding and processing module is adapted to add diagnosis information thereof to a diagnosis message or a response message received by the Diameter message receiving module and transmitted to the Diameter message processing module, and then forward the diagnosis message or the response message via the Diameter message sending module.

14. The system according to claim 12, wherein the destination Diameter node further comprises a Diameter message receiving module, a Diameter message processing module, a Diameter message sending module, and a diagnosis message responding and processing module;
wherein the diagnosis message responding and processing module is connected to the Diameter message processing module, and is adapted to respond and process a diagnosis message received by the Diameter message receiving module and transmitted to the Diameter message processing module, to generate a response message of the diagnosis message and then to send the response message via the Diameter message sending module.

15. The system according to claim 12, wherein the source Diameter node further comprises a Diameter message receiving module, a Diameter message processing module, a Diameter message sending module, a diagnosis message generating and sending module, and a diagnosis message receiving and parsing module; wherein
the diagnosis message generating and sending module is connected to the Diameter message receiving module, and is adapted to send a generated diagnosis message to the Diameter message receiving module and then the diagnosis message is sent via the Diameter message processing module to the Diameter message sending module for forwarding; and
the diagnosis message receiving and parsing module is connected to the Diameter message sending module, and is adapted to parse a response message of the diagnosis message transmitted from the Diameter message processing module to the Diameter message sending module so as to obtain route related information.

16. The system according to claim 12, wherein the intermediate Diameter node and the destination Diameter node are the same Diameter node; or
the source Diameter node, the intermediate Diameter node, and the destination Diameter node are the same Diameter node.

* * * * *